United States Patent
Lee et al.

(10) Patent No.: US 12,217,514 B2
(45) Date of Patent: Feb. 4, 2025

(54) PARKED CAR CLASSIFICATION BASED ON A VELOCITY ESTIMATION

(71) Applicant: TOYOTA RESEARCH INSTITUTE, INC., Los Altos, CA (US)

(72) Inventors: Kuan-Hui Lee, San Jose, CA (US); Charles Christopher Ochoa, San Francisco, CA (US); Arjun Bhargava, San Francisco, CA (US); Chao Fang, Sunnyvale, CA (US)

(73) Assignees: TOYOTA RESEARCH INSTITUTE, INC.; TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 17/732,393

(22) Filed: Apr. 28, 2022

(65) Prior Publication Data

US 2023/0351766 A1  Nov. 2, 2023

(51) Int. Cl.
| | |
|---|---|
| *G06V 20/58* | (2022.01) |
| *B60W 40/04* | (2006.01) |
| *B60W 60/00* | (2020.01) |
| *G06T 7/246* | (2017.01) |
| *G06V 10/764* | (2022.01) |

(52) U.S. Cl.
CPC ............ *G06V 20/58* (2022.01); *B60W 40/04* (2013.01); *B60W 60/001* (2020.02); *G06T 7/248* (2017.01);
(Continued)

(58) Field of Classification Search
CPC .. G06V 20/58; G06V 10/764; G06V 2201/08; G06V 20/56; B60W 40/04;
(Continued)

(56) References Cited

U.S. PATENT DOCUMENTS

| | | | | |
|---|---|---|---|---|
| 9,607,454 | B1 * | 3/2017 | Raghu | G08G 1/0112 |
| 11,810,367 | B2 * | 11/2023 | Fang | G06N 3/044 |

(Continued)

FOREIGN PATENT DOCUMENTS

| | | | | |
|---|---|---|---|---|
| WO | WO-2017147007 A1 * | 8/2017 | | G08G 1/22 |
| WO | WO-2017149385 A1 * | 9/2017 | | G06K 9/00771 |
| WO | 2020144241 A1 | 7/2020 | | |

OTHER PUBLICATIONS

Behrendt, et al., "Is This Car Going to Move? Parked Car Classification for Automated Vehicles," 2019 IEEE Intelligent Vehicles Symposium (IV), 2019, pp. 541-548.
Lee, et al., "PillarFlow: End-to-end Brids-eye-view Flow Estimation for Autonomous Driving", arXiv:2008.01179v3, Aug. 29, 2020.
Yang, et al., "Human-like Decision-Making System for Overtaking Stationary Vehicles Based on Traffic Scene Interpretation", Sensors (Basel). Oct. 12, 2021;21(20):6768.

*Primary Examiner* — Yonel Beaulieu
(74) *Attorney, Agent, or Firm* — Seyfarth Shaw LLP

(57) ABSTRACT

A method controlling an ego vehicle in an environment includes determining, via a flow model of a parked vehicle recognition system, a flow between a first representation of the environment and a second representation of the environment. The method also includes determining, via a velocity model of the parked vehicle recognition system, a velocity of a vehicle in the environment based on the flow. The method further includes determining, via a parked vehicle classification model of the parked vehicle recognition system, the vehicle is parked based on the velocity of the vehicle and one or more of features associated with the vehicle and/or the environment. The method still further includes planning a trajectory of the ego vehicle based on determining the vehicle is parked.

20 Claims, 13 Drawing Sheets

(52) U.S. Cl.
CPC ..... *G06V 10/764* (2022.01); *B60W 2420/408* (2024.01); *B60W 2520/10* (2013.01); *B60W 2554/20* (2020.02); *G06T 2207/10028* (2013.01); *G06T 2207/20081* (2013.01); *G06T 2207/30252* (2013.01); *G06V 2201/08* (2022.01)

(58) Field of Classification Search
CPC ......... B60W 60/001; B60W 2420/408; B60W 2520/10; B60W 2554/20; G06T 7/248; G06T 2207/10028; G06T 2207/20081; G06T 2207/30252
See application file for complete search history.

(56) References Cited

U.S. PATENT DOCUMENTS

| | | | |
|---|---|---|---|
| 2008/0266139 A1* | 10/2008 | Kim | B62D 15/027 |
| | | | 340/932.2 |
| 2016/0264045 A1* | 9/2016 | Ng-Thow-Hing | B60Q 9/00 |
| 2017/0249840 A1* | 8/2017 | Singh | G06V 20/52 |
| 2020/0193827 A1 | 6/2020 | Refsdal et al. | |
| 2020/0202714 A1* | 6/2020 | Gesch | B60W 50/14 |
| 2020/0265247 A1 | 8/2020 | Musk et al. | |
| 2020/0278440 A1 | 9/2020 | Wang et al. | |
| 2022/0414388 A1* | 12/2022 | Fang | G06V 20/584 |
| 2023/0351774 A1* | 11/2023 | Lee | G08G 1/166 |

* cited by examiner

PARKED CAR CLASSIFICATION BASED ON A VELOCITY ESTIMATION

BACKGROUND

Field

Certain aspects of the present disclosure generally relate to identifying parked cars and, more particularly, to a system and method for using a velocity estimate to identify a parked car.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and use the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous agent. Object detection applications for autonomous agents may analyze sensor image data for detecting objects in the surrounding scene from the autonomous agent.

Autonomous agents, such as driverless cars and robots, may interact with other non-autonomous vehicles. Therefore, when planning a trajectory for the autonomous agent, an autonomous driving system may predict an intent of other vehicles, such as other non-autonomous and/or other autonomous vehicles. In such examples, distinguishing parked vehicles from other objects (e.g., vehicles) in an environment may improve the trajectory planning. For example, a parked car may be assumed to be static, while a dynamic object may have uncertain motion. Such uncertainty may propagate to downstream tasks of a route planner, such as decision making and path planning,

SUMMARY

In one aspect of the present disclosure, a method for controlling an ego vehicle in an environment includes determining, via a flow model of a parked vehicle recognition system, a flow between a first representation of the environment and a second representation of the environment. The method further includes determining, via a velocity model of the parked vehicle recognition system, a velocity of a vehicle in the environment based on the flow. The method still further includes determining, via a parked vehicle classification model of the parked vehicle recognition system, the vehicle is parked based on the velocity of the vehicle and one or more of features associated with the vehicle and/or the environment. The method also includes planning a trajectory of the ego vehicle based on determining the vehicle is parked.

Another aspect of the present disclosure is directed to an apparatus including means for determining, via a flow model of a parked vehicle recognition system, a flow between a first representation of the environment and a second representation of the environment. The apparatus further includes means for determining, via a velocity model of the parked vehicle recognition system, a velocity of a vehicle in the environment based on the flow. The apparatus still further includes means for determining, via a parked vehicle classification model of the parked vehicle recognition system, the vehicle is parked based on the velocity of the vehicle and one or more of features associated with the vehicle and/or the environment. The apparatus also includes means for planning a trajectory of the ego vehicle based on determining the vehicle is parked.

In another aspect of the present disclosure, a non-transitory computer-readable medium with non-transitory program code recorded thereon is disclosed. The program code is executed by a processor and includes program code to determine, via a flow model of a parked vehicle recognition system, a flow between a first representation of the environment and a second representation of the environment. The program code further includes program code to determine, via a velocity model of the parked vehicle recognition system, a velocity of a vehicle in the environment based on the flow. The program code still further includes program code to determine, via a parked vehicle classification model of the parked vehicle recognition system, the vehicle is parked based on the velocity of the vehicle and one or more of features associated with the vehicle and/or the environment. The program code also includes program code to plan a trajectory of the ego vehicle based on determining the vehicle is parked.

Another apparatus having a processor, and a memory coupled with the processor and storing instructions operable, when executed by the processor, to cause the apparatus to determine, via a flow model of a parked vehicle recognition system, a flow between a first representation of the environment and a second representation of the environment. Execution of the instructions also cause the apparatus to determine, via a velocity model of the parked vehicle recognition system, a velocity of a vehicle in the environment based on the flow. Execution of the instructions further cause the apparatus to determine, via a parked vehicle classification model of the parked vehicle recognition system, the vehicle is parked based on the velocity of the vehicle and one or more of features associated with the vehicle and/or the environment. Execution of the instructions still further cause the apparatus to plan a trajectory of the ego vehicle based on determining the vehicle is parked.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
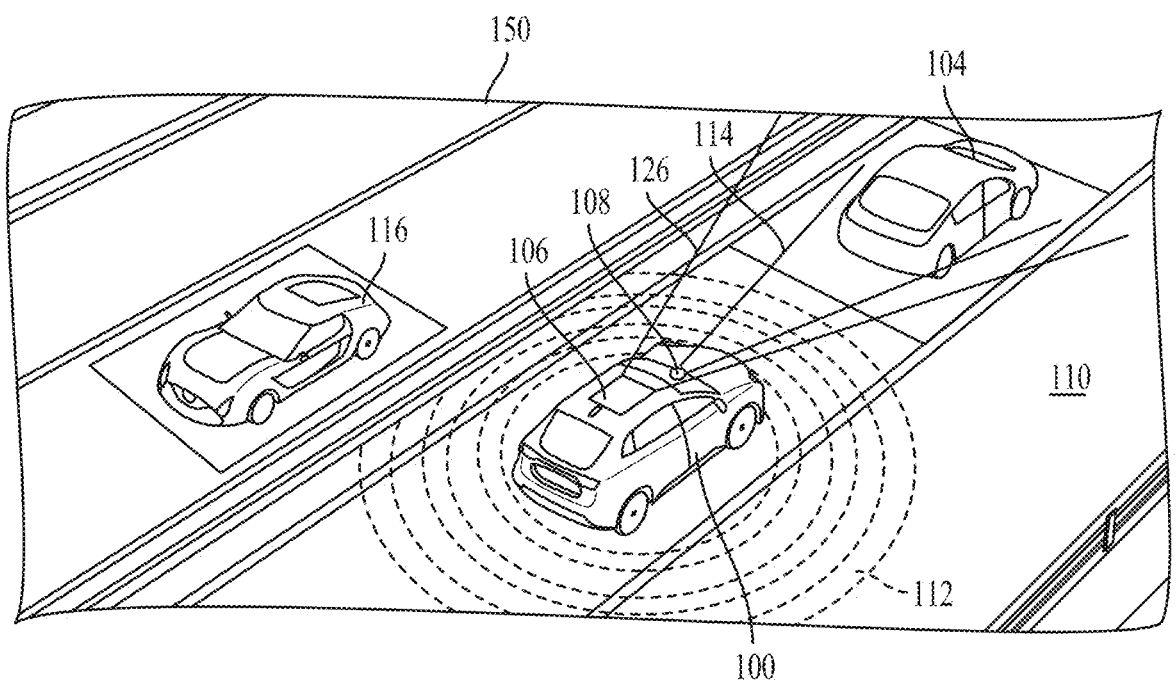
FIG. 1A is a diagram illustrating an example of a vehicle in an environment 150 in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Some current vehicles may use autonomous and/or semi-autonomous control systems to the vehicle in certain situations. Autonomous control systems can generally pilot the vehicle with little to no operator input. In contrast, semi-autonomous systems generally require operator input but can override and/or augment the driver's input under certain situations, such as an impending collision. In some cases, if a vehicle has an autonomous control system, the autonomous control system may plan a trajectory for the vehicle (e.g., autonomous agent) based on a predicted intent of other vehicles, such as other non-autonomous and/or other autonomous vehicles. In some cases, the autonomous control system may disengage and revert to a semi-autonomous or manual control system in situations where the autonomous control system cannot confidently plan the path of the vehicle due to uncertainty regarding the movement of external objects, such as other vehicles.

In such examples, distinguishing parked vehicles from other objects (e.g., vehicles) in an environment may improve trajectory planning. For example, a parked car may be assumed to be static, while a dynamic object may have uncertain motion. Such uncertainty may propagate to downstream tasks of a route planner, such as decision making and path planning. Various conventional systems are used to identify a parked car in an environment. Such conventional systems may include separate networks or components for determining a velocity and/or determining whether a car is parked. However, such conventional systems are not designed as an end-to-end system where an entire model may be trained to classify a vehicle as being parked based on a velocity of the vehicle and other features of the vehicle and/or features of the environment. It may be desirable to improve an accuracy of a parking classification system by implementing an end-to-end framework.

Aspects of the present disclosure are directed to an end-to-end framework for identifying a parked car. In some aspects, vehicle velocity may be integrated with a parked car classification system to improve parked car identification. Specifically, the velocity of a vehicle, such as an autonomous dynamic object (ADO) vehicle, may be used in conjunction with an initial prediction of whether the vehicle is parked. That is, the parked vehicle recognition system may use the velocity and other low-level features of an object and/or an environment to determine if the object (e.g., ADO vehicle) is parked.

The velocity may be determined using various methodologies. In some examples, a flow network is used to determine the velocity. The flow network generates a two-dimensional (2D) flow vector for each grid in a cell, where the cell represents a snapshot of an environment. The use of velocity with other features, such as low-level features, may improve parked vehicle recognition. As a result, the proposed framework outperforms the baseline results by improving accuracy of a parked vehicle recognition system.

Various aspects of the present disclosure may be implemented in an agent, such as a vehicle. The vehicle may operate in either an autonomous mode, a semi-autonomous mode, or a manual mode. In some examples, the vehicle may switch between operating modes. FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LiDAR sensor 106. The 2D camera 108 and the LiDAR sensor 106 may be components of an overall sensor system 102. Other sensors, such as radar and/or ultrasound, are also contemplated. Additionally, or alternatively, although not shown in FIG. 1A, the vehicle 100 may include one or more additional sensors, such as a camera, a radar sensor, and/or a LiDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LiDAR sensor 106 may generate one or more output streams. The first output stream may include a three-dimensional (3D) cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LiDAR sensor 106 uses laser light to sense the shape, size, and position of objects in an environment. The LiDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. In some examples, the information obtained from the sensors 106, 108 may identify whether the vehicle 100 is at an interaction or a crosswalk. Additionally, or alternatively, the information obtained from the sensors 106, 108 may identify whether one or more dynamic objects, such as pedestrians, are near the vehicle 100.

Figure 1B:
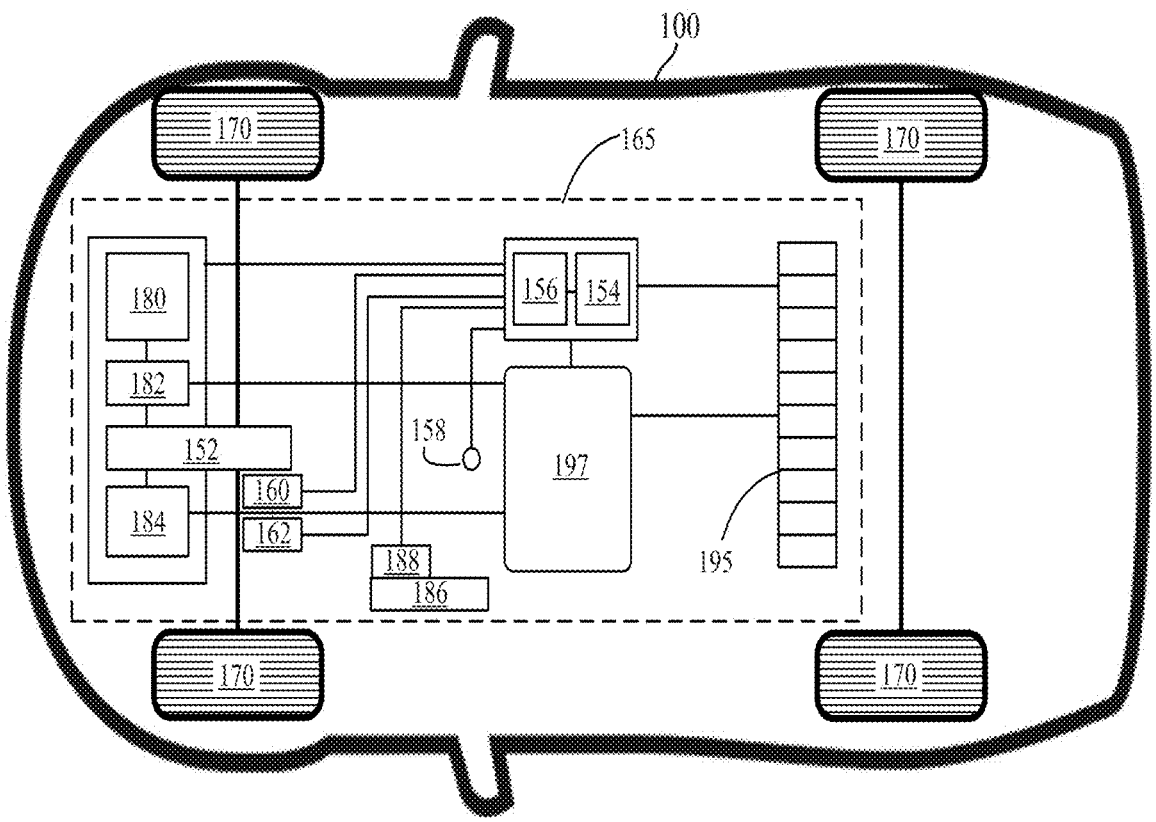
FIG. 1B is a diagram illustrating an example a vehicle, in accordance with various aspects of the present disclosure.

FIG. 1B is a diagram illustrating an example a vehicle 100, in accordance with various aspects of the present disclosure. It should be understood that various aspects of the present disclosure may be directed to an autonomous vehicle. The autonomous vehicle may include be an internal combustion engine (ICE) vehicle, fully electric vehicle (EVs), or another type of vehicle. The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 182 and 184. Transmission 20 can deliver torque output from a combination of engine 180 and MGs 182 and 184. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge the battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 100 may operate in one of an autonomous mode, a manual mode, or a semi-autonomous mode. In the manual mode, a human driver manually operates (e.g., controls) the vehicle 100. In the autonomous mode, an autonomous control system (e.g., autonomous driving system) operates the vehicle 100 without human intervention. In the semi-autonomous mode, the human may operate the vehicle 100, and the autonomous control system may override or assist the human. For example, the autonomous control system may override the human to prevent a collision or to obey one or more traffic rules.

Figure 1C:
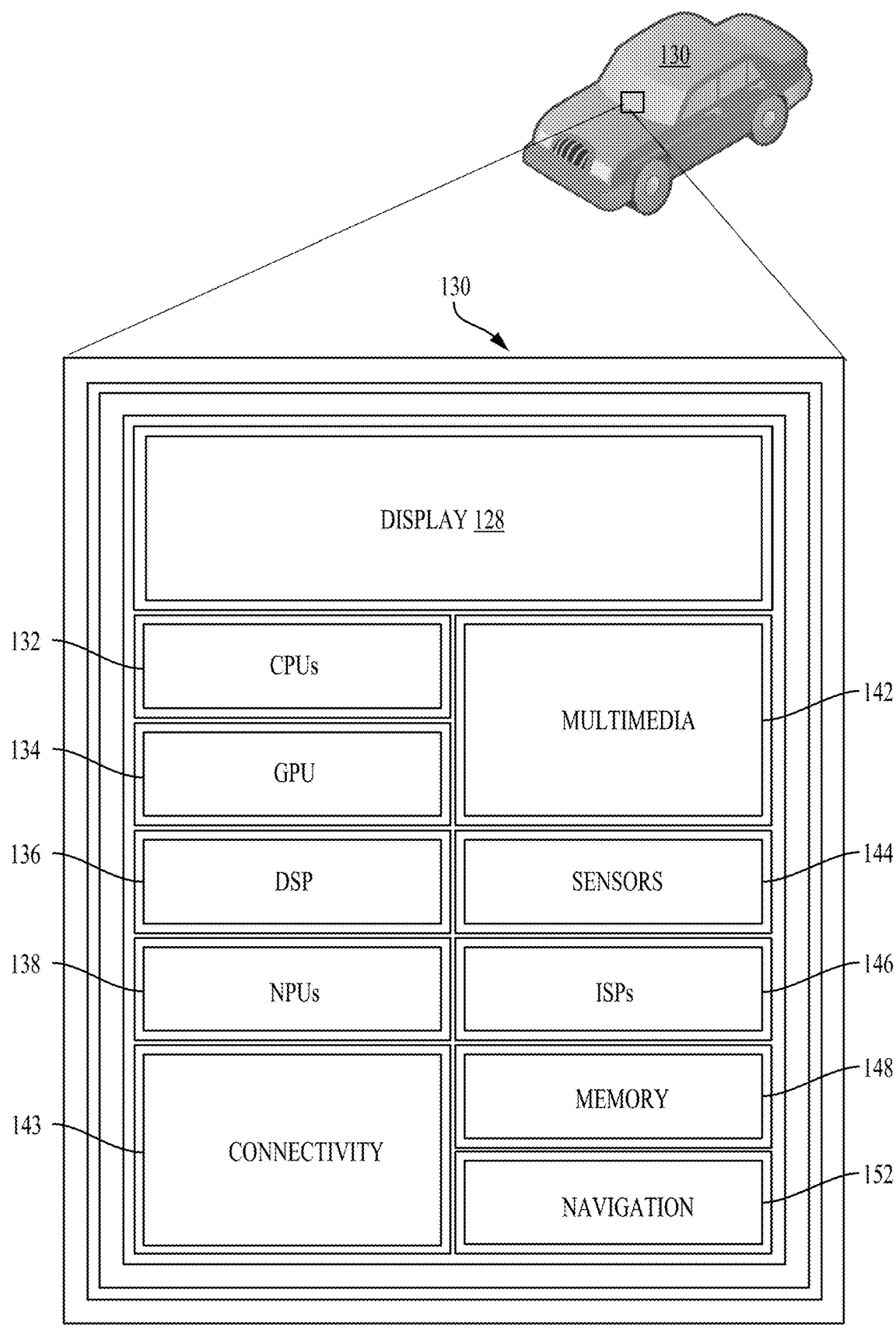
FIG. 1C illustrates an example implementation of designing a neural network using a system-on-a-chip (SOC) for a parked vehicle recognition system of an autonomous vehicle, in accordance with various aspects of the present disclosure.

FIG. 1C illustrates an example implementation of the aforementioned system and method for a convolutional neural network (CNN)-long short-term memory (CNN-LSTM) framework for vehicle taillight recognition using a system-on-a-chip (SOC) 130 of a vehicle vision system for an autonomous vehicle 100. The SOC 130 may include a single processor or multi-core processors (e.g., a central processing unit (CPU) 132), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 138, a CPU 132, a graphics processing unit (GPU) 134, a digital signal processor (DSP) 136, a dedicated memory block 148, or may be distributed across multiple blocks. Instructions executed at a processor (e.g., CPU 132) may be loaded from a program memory associated with the CPU 132 or may be loaded from the dedicated memory block 148.

The SOC 130 may also include additional processing blocks configured to perform specific functions, such as the GPU 134, the DSP 136, and a connectivity block 143, which may include fourth generation long term evolution (4G LTE) connectivity, unlicensed Wi-Fi connectivity, USB connectivity, Bluetooth connectivity, and the like. In addition, a multimedia processor 142 in combination with a display 128 may, for example, classify and categorize poses of objects in an area of interest, according to the display 128 illustrating a view of the vehicle 100. In some aspects, the NPU 138 may be implemented in the CPU 132, DSP 136, and/or GPU 134. The SOC 130 may further include a sensor processor 144, image signal processors (ISPs) 146, and/or navigation 120, which may, for instance, include a global positioning system.

The SOC 130 may be based on an Advanced Risk Machine (ARM) instruction set or the like. In another aspect of the present disclosure, the SOC 130 may be a server computer in communication with the autonomous vehicle 100. In this arrangement, the autonomous vehicle 100 may include a processor and other features of the SOC 130. In this aspect of the present disclosure, instructions loaded into a processor (e.g., CPU 132) or the NPU 138 of the autonomous vehicle 100 may include code for detecting/recognizing vehicle taillights of an ado vehicle in a region of interest in an image captured by the sensor processor 144. The instructions loaded into a processor (e.g., CPU 132) may also include code for planning and control (e.g., intention prediction of the ado vehicle) in response to the vehicle taillights of the ado vehicle detected/recognized in the region of interest in the image captured by the sensor processor 144.

Figure 2:
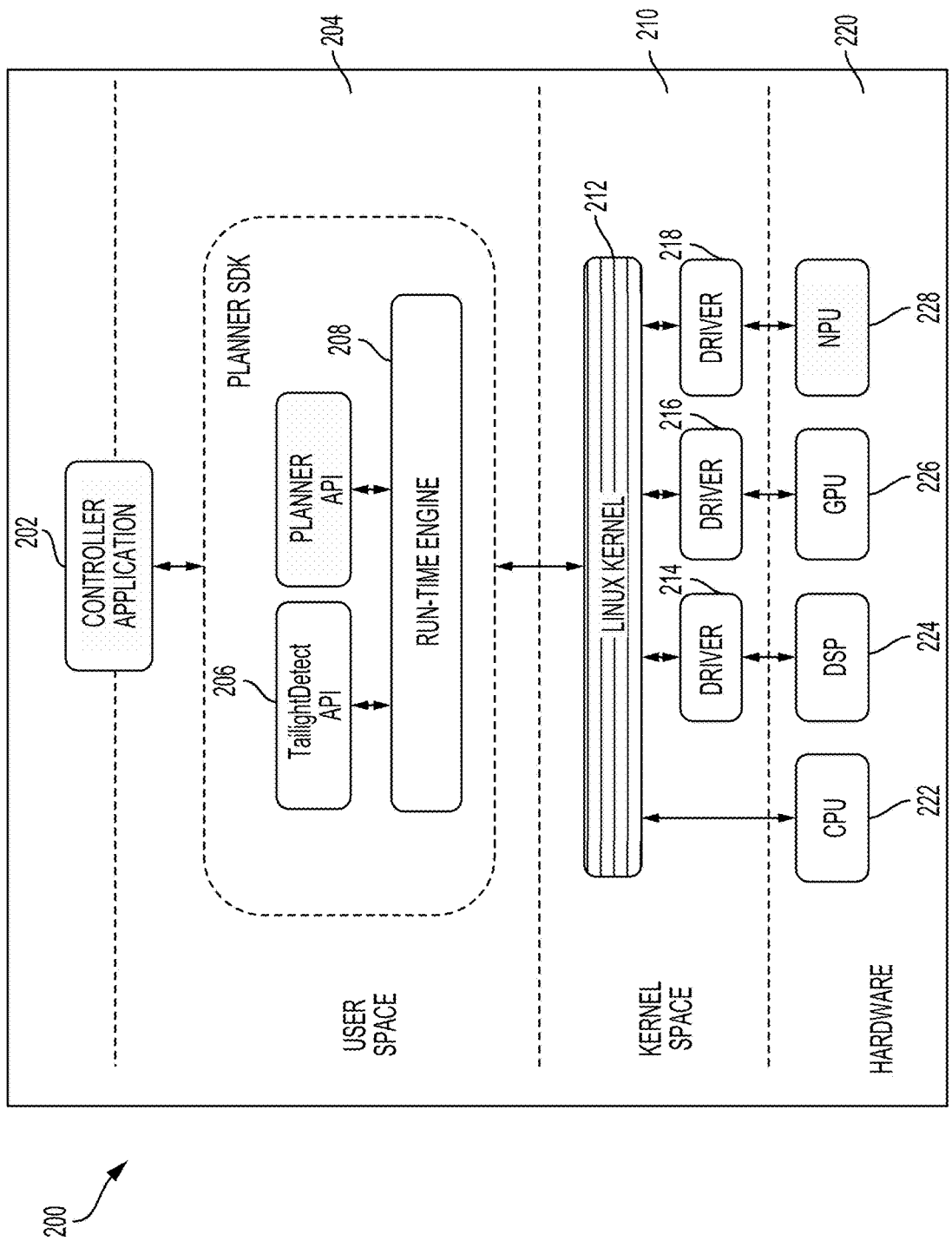
FIG. 2 is a block diagram illustrating a software architecture that may modularize artificial intelligence (AI) functions for identifying a parked car of an autonomous agent vision system, in accordance with various aspects of the present disclosure.

FIG. 2 is a block diagram illustrating a software architecture 200 that may modularize artificial intelligence (AI) functions for planning and control of an autonomous agent for inferring ado vehicle intention in response to ado vehicle taillight recognition, according to aspects of the present disclosure. Using the architecture, a controller application 202 may be designed such that it may cause various processing blocks of an SOC 220 (for example a CPU 222, a DSP 224, a GPU 226 and/or an NPU 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
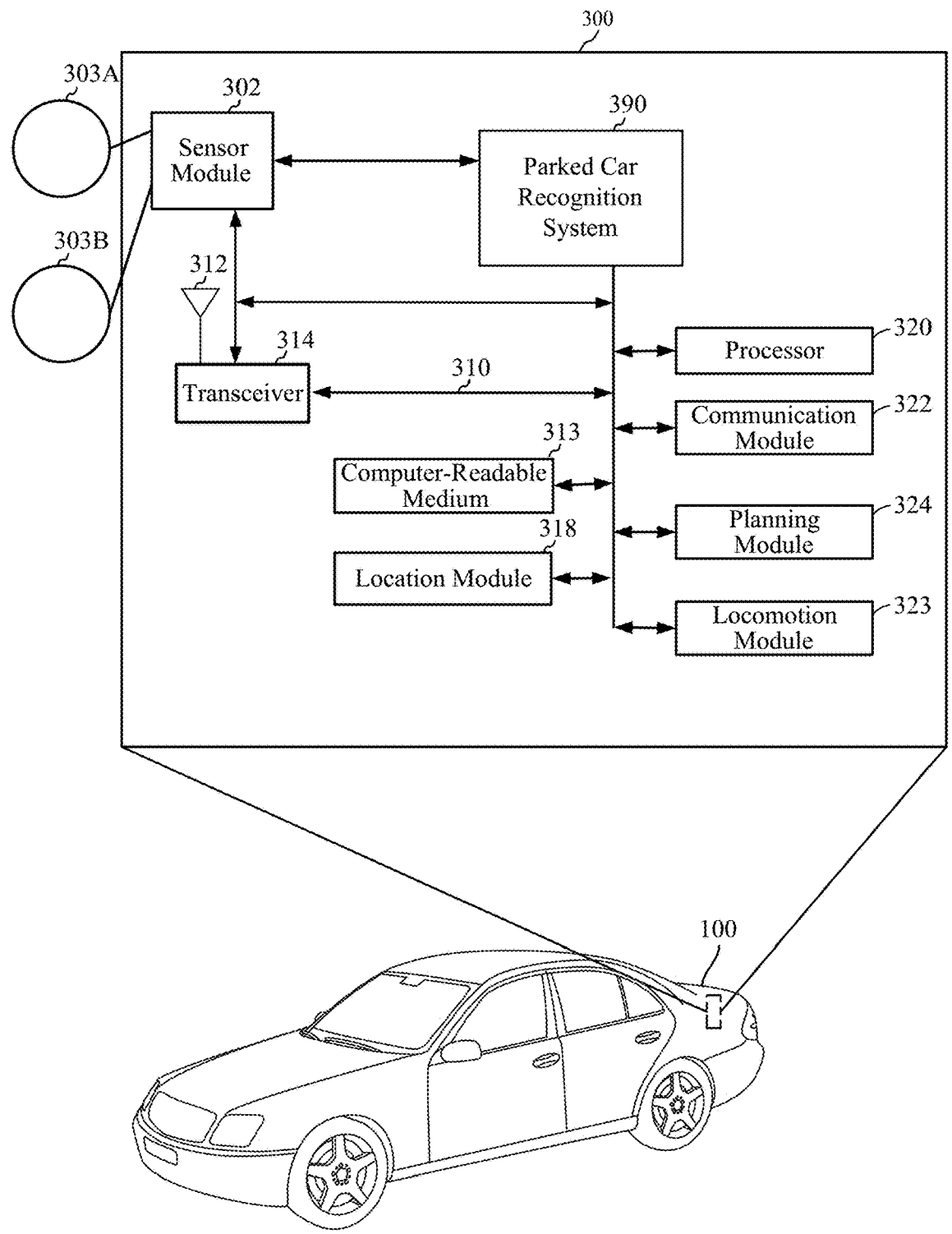
FIG. 3 is a diagram illustrating an example of a hardware implementation for a parked vehicle recognition system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a parked vehicle recognition system 390. In some examples, parked vehicle recognition system 390 is configured to perform operations, including operations of the process 800 described with reference to FIG. 8.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, a comfort module 308, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device. As another example, the transceiver 314 may transmit driving statistics and information from the comfort module 308 to a server (not shown).

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 328, or any of the modules 302, 313, 314, 318, 320, 322, 323, 324, 390. The computer-readable medium 313 may also be used for storing data that is manipulated by the processor 320 when executing the software.

The sensor module 302 may be used to obtain measurements via different sensors, such as a first sensor 303A and a second sensor 303B. The sensors 303A and 303B may be components of the sensor system 102 as described in FIG. 1A. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the comfort module 308, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 328 or may be in communication with the vehicle 328.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 328. For example, the location module 318 may use a global positioning system (GPS) to determine the location of the vehicle 328. The communication module 322 may be used to facilitate communications via the transceiver 314. For example, the communication module 322 may be configured to provide communication capabilities via different wireless protocols, such as Wi-Fi, long term evolution (LTE), 3G, etc. The communication module 322 may also be used to communicate with other components of the vehicle 328 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 328. As an example, the locomotion module 323 may control movement of the wheels. As another example, the locomotion module 323 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 328, via the locomotion module 323. A route may be planned to a passenger based on compartment data provided via the comfort module 308. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The parked vehicle recognition system 390 may be in communication with the sensor module 302, the transceiver 314, the processor 320, the communication module 322, the location module 318, the locomotion module 323, the planning module 324, and the computer-readable medium 313. In some examples, the behavior planning system may be implemented as a machine learning model, such as a vehicle control system 300 as described with reference to FIG. 3.

Working in conjunction with one or more of the sensors 303A, 303B, the sensor module 302, and/or one or more of the other modules 313, 314, 318, 320, 322, 323, 324, the parked vehicle recognition system 390 may determine, via a flow model of a parked vehicle recognition system, a flow between a first representation of the environment and a second representation of the environment. Additionally, the parked vehicle recognition system 390 may determine, via a velocity model of the parked vehicle recognition system, a velocity of a vehicle in the environment based on the flow. Furthermore, the parked vehicle recognition system 390 may determine, via a parked vehicle classification model of the parked vehicle recognition system, the vehicle is parked based on the velocity of the vehicle and one or more of features associated with the vehicle and/or the environment. Also, the parked vehicle recognition system 390 may plan a trajectory of the ego vehicle based on determining the vehicle is parked.

Figure 4:
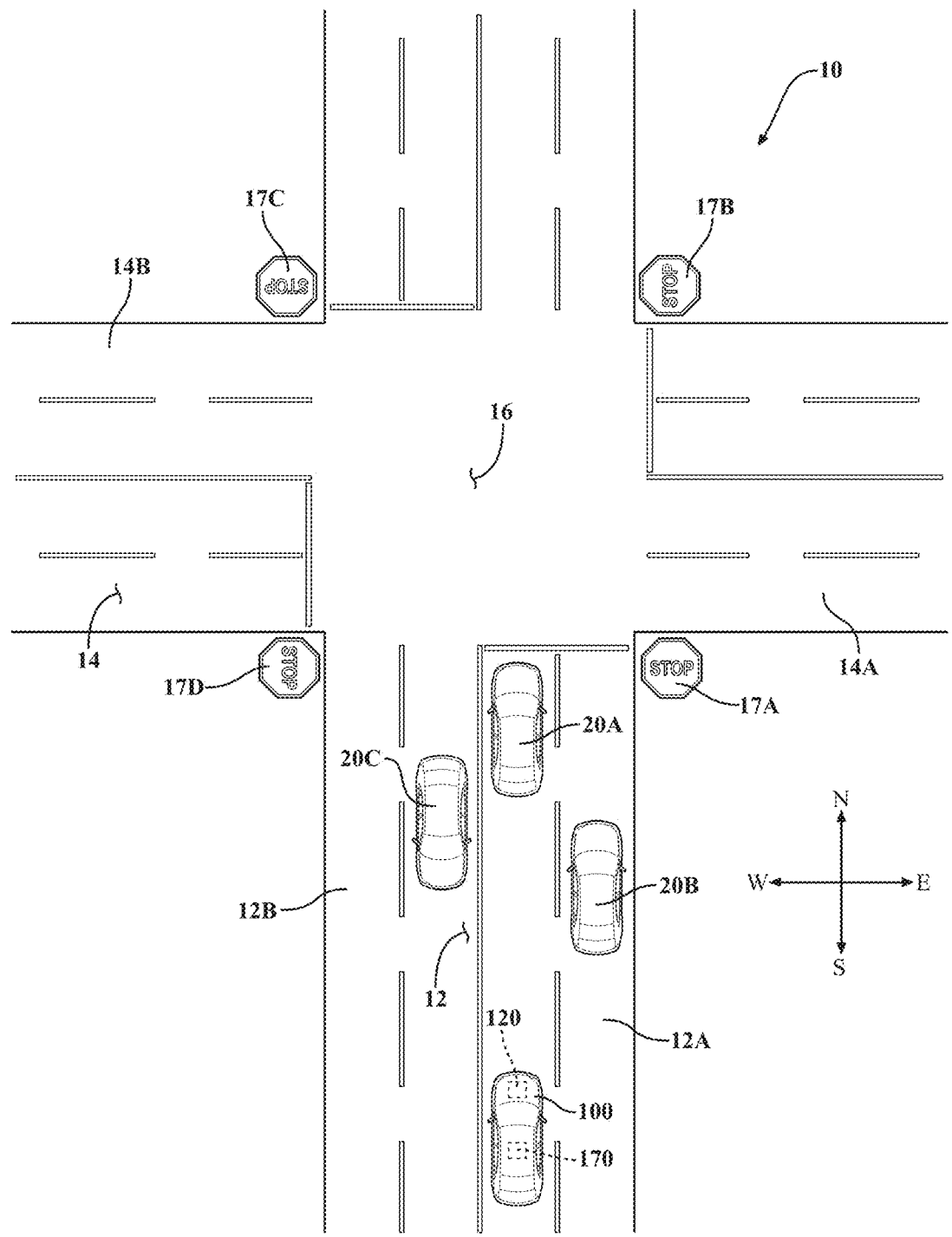
FIG. 4 is a block diagram illustrating an example of a scene having an ego vehicle that includes a parked vehicle recognition system, in accordance with various aspects of the present disclosure.

FIG. 4 is a block diagram illustrating an example of a scene 10 having an ego vehicle 100 that includes a parked vehicle recognition system 390, in accordance with various aspects of the present disclosure. The scene 10 is an example to provide some context regarding how the parked vehicle classifier 550 operates. It should be understood that the scene 10 is just one type of example environment that the parked vehicle recognition system 390 may be utilized within. Here, the scene 10 includes a road 12 and a road 14 that meet each other at an intersection 16. The road 12 includes a northbound lane 12A and a southbound lane 12B. The road 14 includes an eastbound lane 14A and a westbound lane 14B. In this example, the intersection 16 is a four-way stop, as indicated by the stop signs 17A-17D. As such, a vehicle approaching the intersection 16 must first stop before entering the intersection 16.

Located in the northbound lane 12A is the ego vehicle 100 that includes the parked vehicle recognition system 390. The ego vehicle 100 may be a semiautonomous and/autonomous vehicle. The ego vehicle 100 also includes a sensor system 102 for sensing the environment, including portions of the scene 10 in which the ego vehicle 100 operates.

Also located in the northbound lane 12A are vehicles 20A and 20B. In this example, vehicle 20A is stopped near the intersection 16 and is waiting to proceed through the intersection 16. As such, based on the definition given above regarding a parked vehicle, the vehicle 20A is not a parked vehicle and is merely waiting in response to a signal, in this case, in the form of the stop sign 17A. After briefly stopping, the vehicle 20A will proceed through the intersection 16. As to the vehicle 20B, this vehicle is also located in the northbound lane 12A. In this example, the vehicle 20B is parked in that it remains stationary until the ego vehicle 100 passes or otherwise overtakes the vehicle 20B.

Located in the southbound lane 12B is another vehicle 20C that has successfully moved through the intersection 16 and is continuing and a southbound direction. Unlike the vehicle 20A and the vehicle 20B, the vehicle 20C is currently moving and will not be determined to be parked.

As discussed, the parked vehicle recognition system 390 can determine, using a random forest model, when the vehicle, such as the vehicle 20B, is parked based on a velocity, vehicle estimated features, vehicle learned features, vehicle taillight features of the vehicle, and/or other features that are based on sensor data from the sensor system 102. By determining which vehicles are parked in which ones are not, the autonomous or semi-autonomous vehicle system of the ego vehicle 100 can spend more time and/or computational resources focusing on moving or soon to be moving objects, such as the vehicles 20A and 20C.

The vehicle 100 may include an autonomous and/or semi-autonomous vehicle control systems that may control the operation of the vehicle 100. As discussed, autonomous vehicle control systems may pilot the vehicle 100 from one destination to another with little to no human input. Conversely, semi-autonomous vehicle control systems require input from the driver to travel from one destination to another but can augment the driver's inputs in certain situations, such as avoiding a collision. In either case, knowledge regarding the predicted movements of external vehicles can be important regarding the operation of these systems.

In some implementations, a parked vehicle classifier system may be used by an autonomous vehicle control system and/or a semi-autonomous vehicle control system to determine if a vehicle (e.g., ADO vehicle) is parked. In some examples, the parked vehicle classifier system can determine if other vehicles near an ego vehicle are parked using a random forest classifier that considers different types of features, including vehicle estimated features, vehicle learned features, and vehicle taillight features of the vehicles near the ego vehicle. A vehicle is determined to be parked if it should be treated as a static obstacle by one or more vehicle control systems of the ego vehicle.

The use of a random forest classifier has several advantages. For example, it is fairly easy to train and converge with large-scale training data. Additionally, the random forest classifier is relatively lightweight and can achieve very fast runtime performance, which may be critical in motion planning for a vehicle. Further still, the random forest classifier is a nonparametric method with a tree structure, which is flexible and allows analysis and debugging in failure cases.

In one example, a vehicle may be determined to be parked if the vehicle is expected to remain stationary with enough confidence to be driven around or overtaken by the ego vehicle. This may include unoccupied vehicles that are not autonomous vehicles, permanently disabled vehicles, vehicles undergoing repair, and vehicles that are being loaded or unloaded with cargo and/or people. As such, vehicles that are merely standing such that they are waiting for some external action to occur before they move would not be considered parked vehicles.

Examples of non-parked vehicles that are standing could include vehicles waiting for a signal change, vehicles in slow or nonmoving traffic, and/or vehicles waiting for a pedestrian or other vehicle to move out of the way. It should be understood that the examples given are merely examples, and there are numerous other situations when a vehicle is parked such that the vehicle is expected to remain stationary with enough confidence to be driven around or overtaken by the ego vehicle. Additionally, the type of vehicle that may be parked can vary significantly and should not be limited. Moreover, vehicles can include any type of vehicle capable of moving persons and/or objects from one place to another. For example, vehicles could include automobiles, trucks, motorcycles, bicycles, scooters, and the like. As such, the vehicle may be motorized or nonmotorized transport.

Figure 5A:
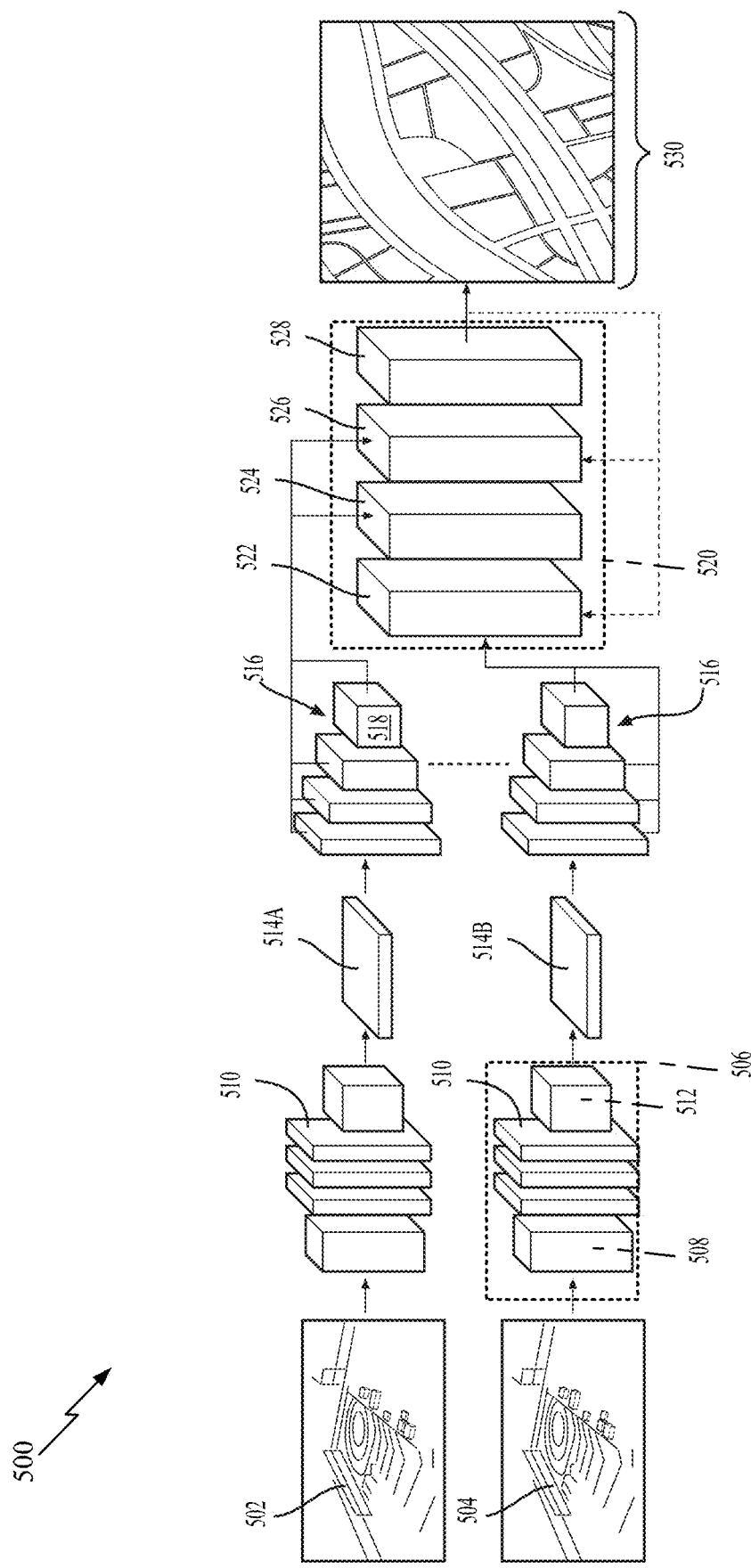
FIG. 5A is a block diagram illustrating an example of a vehicle feature model, in accordance with various aspects of the present disclosure.

As discussed, in some examples, a velocity of objects in a scene, such as the scene 10, may be determined by a machine learning model. In some such examples, a flow network is used to determine a velocity of objects in a scene. FIG. 5A is a block diagram illustrating an example of a vehicle feature model 500, in accordance with various aspects of the present disclosure. The vehicle feature model 500 may be a component of the parked vehicle recognition system 390 described with reference to FIG. 3. Additionally, or alternatively, one or more elements of the vehicle feature model 500 may be executed via the SOC 130 and/or processor 320 as described with reference to FIGS. 1 and 3, respectively. The vehicle feature model 500 may estimate a 2D birds-eye view (BeV) flow by combining a pillar feature network 506 and a flow estimation network 520.

As shown in the example of FIG. 5A, a pillar feature network 506 may receive a first LiDAR sweep 502 associated with a current time (t) and a second LiDAR sweep 504 associated with a previous time (t−1). The two sweeps 502, 504 may be consecutive in time and may be aligned into a same coordinate frame. The consecutive LIDAR sweeps 502, 504 may include information from a scene that includes the external vehicle that will be determined by the parked vehicle recognition system 390 as being parked or not being parked. The original coordinates of the second LiDAR sweep 504 may be transformed to a coordinate frame of the first LiDAR sweep 502 using the odometry information of an ego agent, such as the vehicle 100 described with reference to FIGS. 1A, 1B, 1C, and 3. The LiDAR sweeps 502, 504 may be referred to as point clouds or 3D point clouds. The two LiDAR sweeps 502, 504 may be encoded by the pillar feature network 506 to generate two BeV pseudo-images 514A, 514B, where each cell in the BeV pseudo-images 514A, 514B has a learned embedding based on points that fall inside it.

As discussed, the pillar feature network 506 may be used to extract two BeV pseudo-images 514A, 514B from the consecutive LiDAR sweeps 502, 504. In some examples, the same pillar feature network 506 may be used to process each LiDAR sweep 502, 504. In other examples, different pillar feature networks 506 may be used to process each LiDAR sweep 502, 504. In such examples, the different pillar feature networks 506 may share weights for a point network 510. The process for extracting each BeV pseudo-image 514A, 514B may include voxelizing a respective point cloud 514A, 514B via a voxelizer 508. The voxelizer 508 may discretize an x-y plane, thus creating a set of pillars (e.g., grid cells) in birds-eye-view. The voxelized point cloud may be structured as a (D, P, N)-shaped tensor where the variable D represents a number of point descriptors, the variable P represents a number of pillars, and the variable N represents a number of points per pillar. In some examples, the number of point descriptors D may be set to nine, where the first four values denote coordinates x, y, z, and reflectance r. The next five values are the distances to an arithmetic mean $x_c$, $y_c$, $z_c$, of all points in a pillar and an offset $x_p$, $y_p$ from a pillar center.

The tensor generated by the voxelizer 508 may be processed by a multi-layered point network (e.g., pointnet) 510. The point network 510 may generate a feature map having a shape (C, P, N). The feature map may be compressed by a max operation over a last dimension, resulting in a (C, P) encoded feature map with a C-dimensional feature embedding for each pillar. Finally, the encoded features may be scattered back to original pillar locations, via a scatter module 512, to create a BeV pseudo-image tensor 514A or 514B having a shape (C, H, W), where H indicates a height and W indicates a width of the BeV pseudo-image 514A or 514B.

In some examples, a 2D BeV flow estimation is performed to accurately associate the embeddings (e.g., pillar features) between the 2D BeV pseudo-images 514A, 514B. In some examples, architecture parameters such as receptive field and correlation layer parameters may be adjusted to account for a maximum relative motion that would be expected to be encountered between consecutive LiDAR sweeps 502, 504 (given the time delta between frames, grid resolution, and typical vehicle speeds). As shown in FIG. 5A, the pillar features may be further encoded via a feature pyramid network 516. The feature pyramid network 516 may include multiple layers 518. The output of each feature pyramid 516 may be received at the flow estimation network 520. The flow estimation network 520 may also be referred to as a flow network 520.

As shown in FIG. 5A, the encoded features of the second point cloud 504 may be warped based on a warping function 522 of the flow estimation network 520. The warping function 522 may align the tail lights between two images. A cost volume layer 524 is then used to estimate the flow between the first LiDAR sweep 502 and the second LiDAR sweep 504 by matching a cost. The matching cost may be defined as the correlation between the two feature maps. That is, the cost volume layer 524 may determine a correlation between the two feature maps associated with the LiDAR sweeps 502, 504. The flow estimator 526 may fuse extracted features in a current scale level with the estimated flows from lower scales. Finally, a context network 528 is applied to exploit contextual information for additional refinement. The context network 528 is a feed-forward CNN based on dilated convolutions, along with batch normalization and rectified linear activation unit (ReLU). As shown in FIG. 5A, the features received at the warping function 522, and flow estimator 526 may be upsampled.

The 2D BeV flow 530 generated by the vehicle feature model 500 may identify the motion of objects surrounding an ego agent associated with the vehicle feature model 500. In some examples, the 2D BeV flow 530 may include a 2D flow vector for each grid cell. In such examples, the 2D flow vector may be a single mean velocity and co-variance per object cluster. A grid cell may be a cell in an occupancy grid map (OGM). Occupancy grid maps may be used to represent scene obstacle occupancy for robotics applications. Estimation of a per cell motion state within an occupancy grid may be referred to as dynamic occupancy grid map (DOGMa) estimation.

It should be understood that the vehicle feature model 500 of FIG. 5A is just but one example of a model that may determine the vehicle learned features of the external vehicle. As discussed, the vehicle feature model 500 is a deep learning framework that receives, as inputs, two separate and consecutive LiDAR sweeps 502 and 504, which may be in the form of point clouds, from the LiDAR sensor(s) of the sensor system 102, at two different moments. The output 530 of the vehicle feature model 500 may include the learned velocity and/or learned absolute speed of the external vehicle. The learned velocity may include velocities in the X and Y directions.

Figure 5B:
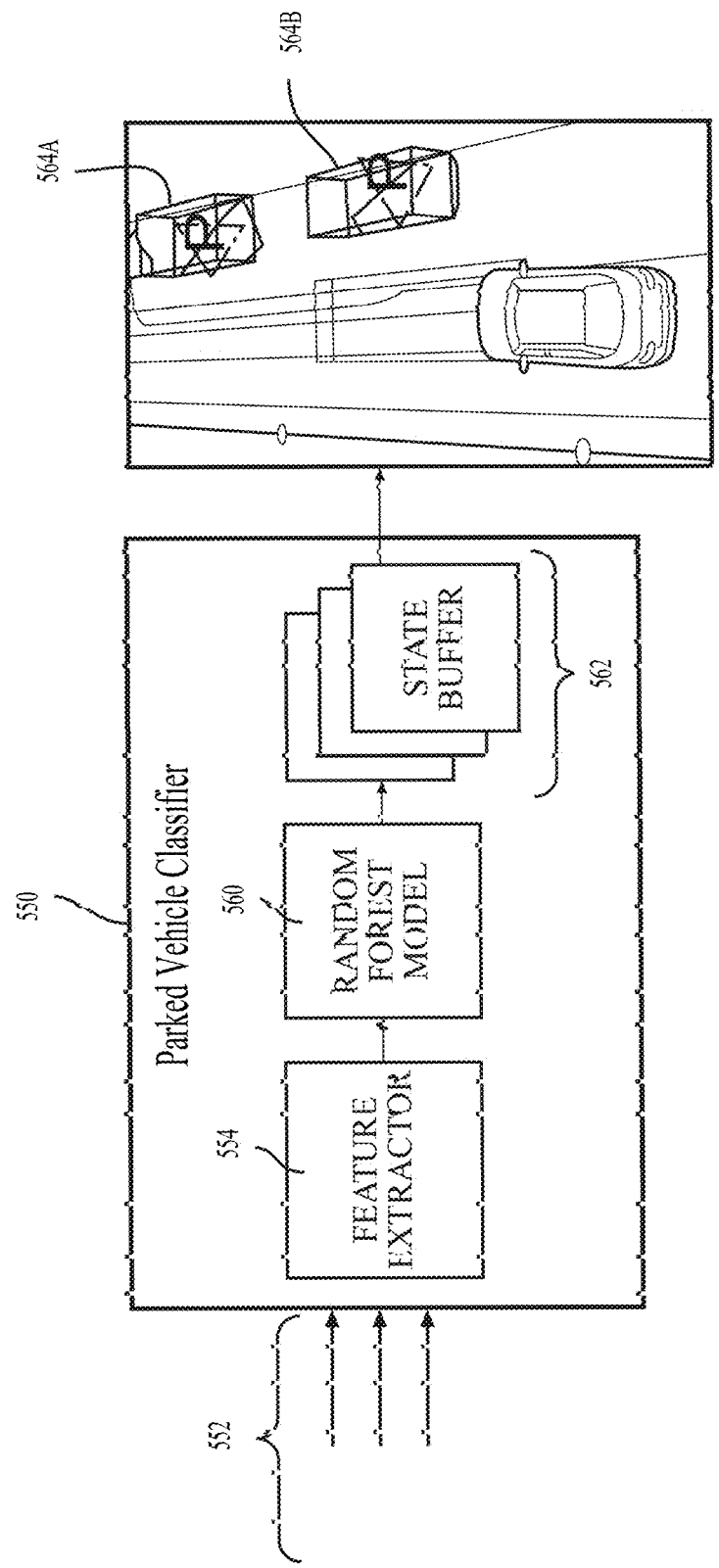
FIG. 5B is a block diagram illustrating an example of a parked vehicle classifier, in accordance with various aspects of the present disclosure.

FIG. 5B is a block diagram illustrating an example of a parked vehicle classifier 550, in accordance with various aspects of the present disclosure. The parked vehicle classifier 550 may be one component of the parked vehicle recognition system 390 described with reference to FIG. 3. As discussed, a vehicle may be considered to be parked if the vehicle is expected to remain stationary with enough confidence to be driven around or overtaken by the ego vehicle 100. Here, the parked vehicle classifier 550 receives inputs 552 that may be provided from a one or more different sources, such as other vehicle systems and subsystems of the ego vehicle 100 and/or systems and subsystems that are external from the ego vehicle 100, such as a cloud-based server and/or edge server, such as a roadside edge server. The inputs 552 may include sensor data and/or data from other systems, neural networks, and/or discrete functions, that have interpreted the sensor data, such as an object detection system and/or an object tracking system.

A feature extractor 554, may provide a list of features to the random forest model 560. The random forest model 560 then outputs one or more state buffers that can identify a vehicle and determine if the vehicle is parked at different moments in time. The feature extractor may be one or more models, such as a taillight feature model and/or the vehicle feature model 500.

As discussed, the random forest model 560, may consider vehicle estimated features, vehicle velocity, vehicle learned features, and/or vehicle taillight features. With regards to the vehicle estimated features, the vehicle estimated features can include a number of different features such as an object type of the external vehicle, a distance from a center point of the external vehicle to a road boundary, an estimated absolute speed of the external vehicle, a distance to the nearest intersection from the external vehicle, a map location type, a free lane ratio, and an edge distance between an edge of the external vehicle and the road boundary. The vehicle estimated features may also be referred to as low-level features. The vehicle estimated features may be determined by interpreting data from the sensor system 102 of the ego vehicle 100 and/or map information.

The object type of the external vehicle provides information regarding the vehicle type of the external vehicle. For example, object type could include automobile, motorcycle, bicycle, truck, delivery truck, tractor-trailer, tractor, bicycle, scooter, and the like. The estimated velocity of the external vehicle indicates the velocity of the external vehicle. The velocity may be provided in different directions, such as the X and Y directions. As discussed, the velocity may be determined based on the flow network 520 and a velocity network 570. The absolute speed of the vehicle is self-explanatory and is the absolute speed of the external vehicle. The vehicle estimated features may also include other information, such as determining if the vehicle 20A is located in a parking lane and/or map location type, which may indicate the type of surface the vehicle 20B is parked on, such as an intersection, normal lane, parked lane, etc.

Furthermore, as shown in FIG. 5B, the output of the random forest model 560 may be stored in one or more state buffers 562. Each state buffer 562 may relate to a different moment in time, indicating if a particular vehicle is parked or not. The state buffers 562 may then be provided to one or more downstream processes, such as processes associated with an autonomous driving system. For example, if an external vehicle is parked, the autonomous driving system can make appropriate decisions regarding how to pilot the ego vehicle 100 around one or more parked vehicles. Furthermore, because certain external vehicles are determined to be parked, the autonomous driving system can focus more time and/or computational resources on tracking the movement of other objects that are not parked.

In one example, working in conjunction with the state buffers 562, an object detection system may generate one or more bounding boxes 564A and 564B with respect to the ego vehicle 100. The bounding boxes 564A and 564B may include information if the vehicle represented by the bounding boxes 564A and 564B are parked.

Figure 5C:
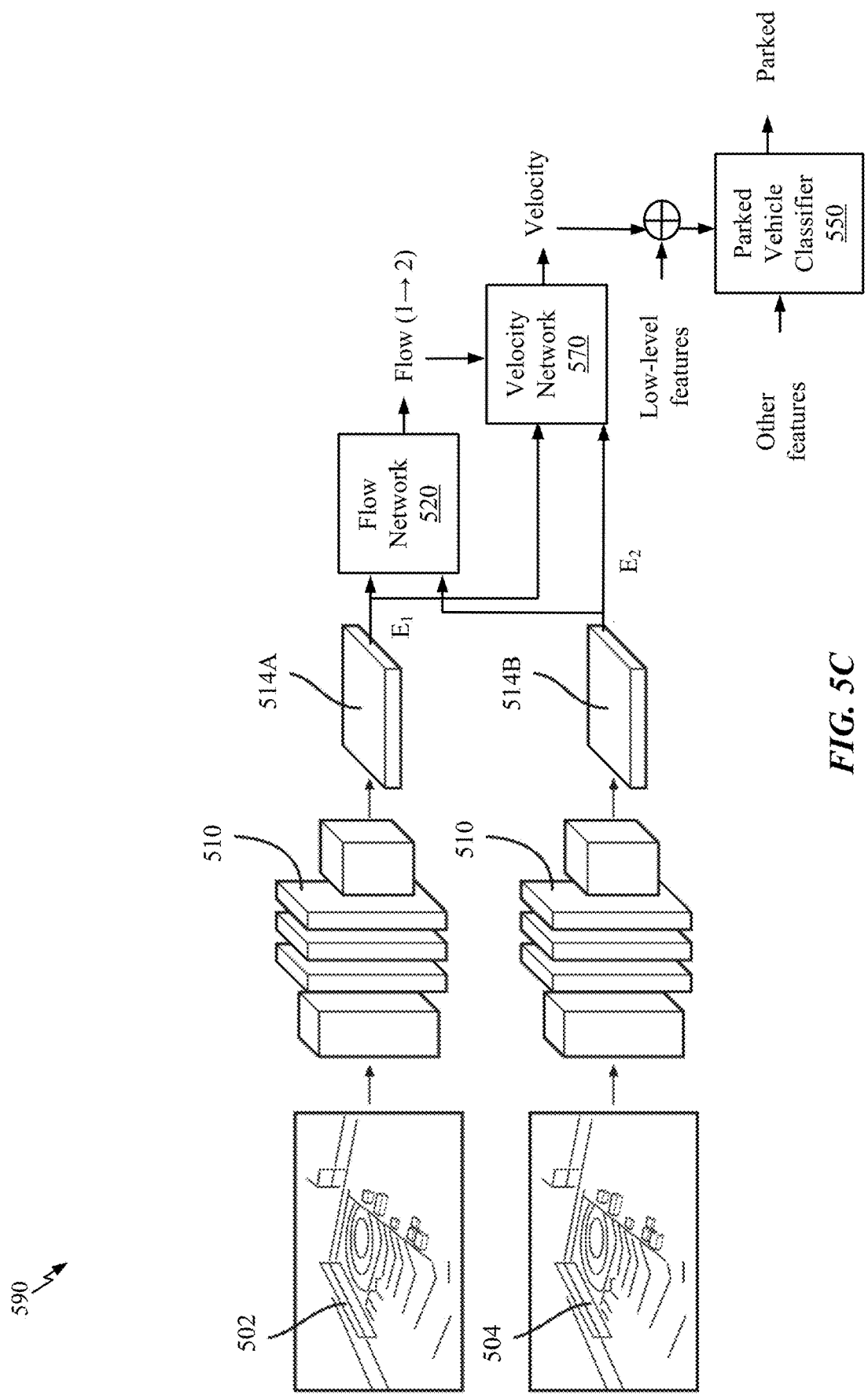
FIG. 5C is a block diagram illustrating an example of an end-to-end framework for a parked vehicle recognition system that uses velocity and features of an environment to predict whether a vehicle is parked, in accordance with various aspects of the present disclosure.

FIG. 5C is a block diagram illustrating an example of an end-to-end framework for a parked vehicle recognition system 390 that uses velocity and features of an environment to predict whether a vehicle is parked, in accordance with various aspects of the present disclosure. In some examples, the parked vehicle recognition system 390 may be a component of a vehicle, such as an ego vehicle 100. Additionally, the parked vehicle recognition system 390 may determine an intent of one or more other vehicles, such as ADO vehicles.

As shown in the example of FIG. 5C, a flow network 520 may generate a 2D flow vector for each grid cell in a scene. The flow network 520 may receive BEV embedding ($E_1$) from a first BeV pseudo-image 514A and BEV embedding ($E_2$) from a second BeV pseudo-image 514B. The 2D flow vector may also be referred to as the flow or the flow of a scene. As discussed, the 2D flow vector represents a single mean velocity and co-variance per object cluster. That is, the 2D flow vector may describe a flow of an entire scene. Specifically, the flow vector describes a flow of the scene from a second LiDAR sweep 504 at time t−1 to the first LiDAR sweep 502 at time t (e.g., a current time). The scene may be represented in the first LiDAR sweep 502 and the second LiDAR sweep 504. The 2D flow vector and the embedding $E_1$ and $E_2$ from the respective BeV pseudo-images 514A, 514B may be processed by a velocity network 570 to determine a velocity of each object in a scene (e.g., environment). The velocity generated by the velocity network 570 may be an example of an instance label. The velocity of each object in a scene may be concatenated with vehicle estimated features associated with the object. The vehicle estimated features may include, but are not limited to, a distance to a sensor (e.g., camera) of the ego vehicle, an angle of the object in relation to the sensor of the ego vehicle, a distance to a curb, and/or other low-level features.

The concatenated features (e.g., the velocity concatenated with the low vehicle estimated features) may be received at a parked vehicle classifier 550. Additionally, in some examples, the parked vehicle classifier 550 receives other features associated with the object and/or the environment, such as a turn signal status of the object or a brake light status of the object. The turn signal status may indicate whether the turn signal is on or off. Additionally, the brake light status may indicate whether the brake light is on or off. The other features may be obtained from one or more other networks trained to extract the respective features from an input signal, such as an image of the scene.

The parked vehicle classifier 550 may use the velocity in conjunction with the low-level features and/or the other features to predict whether a vehicle is parked. As an example, if the velocity of the vehicle is zero and the distance between the vehicle and the curb satisfies a distance condition, then the parked vehicle classifier 550 may predict that the vehicle is parked. The distance condition may be satisfied if the distance between the vehicle and the curb is less than or equal to a distance threshold.

As shown in FIG. 5C, the velocity predicted by the velocity network 570 may be associated with a velocity loss $\mathcal{L}_v$ and the flow predicted by the flow network may be associated with a flow loss $\mathcal{L}_f$. Furthermore, the prediction by the parked vehicle classifier 550 may be associated with a classification loss $\mathcal{L}_{BCE}$. During training, the parked vehicle recognition system 390 may be trained to reduce a total loss $\mathcal{L}_{total}$, which may be a sum of velocity loss $\mathcal{L}_v$, the flow loss $\mathcal{L}_f$ and the classification loss $\mathcal{L}_{BCE}$. That is, $\mathcal{L}_{total} = \alpha \mathcal{L}_f + \beta \mathcal{L}_v + \gamma \mathcal{L}_{BCE}$, where α, β, and γ are configurable hyperparameters. BCE refers to a binary cross entropy. In some examples, the loss may be a cross entropy (CE) loss.

As discussed, in some implementations, the parked vehicle recognition system 390 is trained end-to-end. The end-to-end training may improve an overall parked car classification. That is, because the parked vehicle recognition system 390 is trained end-to-end the velocity loss $\mathcal{L}_v$, the flow loss $\mathcal{L}_f$, and the classification loss $\mathcal{L}_{BCE}$ may be minimized for the system as a whole. In contrast, conventional systems are not trained end-to-end. Rather, conventional parked car classification systems may separately train each component. Because each component is separately trained, the loss may not be minimized for the system as a whole, therefore, the parked car classification may less accurate in comparison to a system that is trained end-to-end.

Figure 5D:
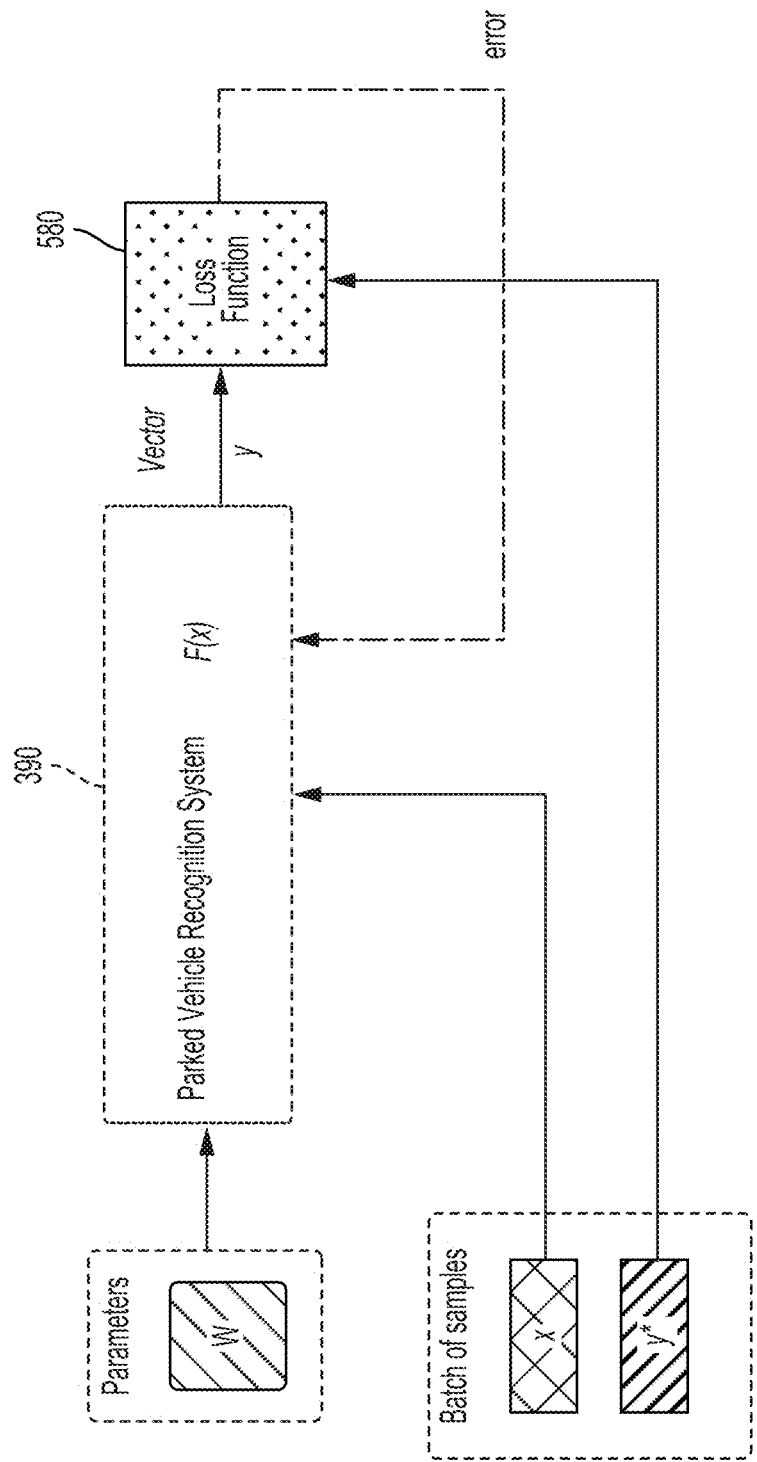
FIG. 5D illustrates a block diagram for training a parked vehicle recognition system, in accordance with various aspects of the present disclosure.

FIG. 5D illustrates a block diagram for training a parked vehicle recognition system 390, in accordance with various aspects of the present disclosure. In one configuration, data (x) may be received from different sensors of the vehicle 100 and/or other information sources. As an example, the data (x) may include the LiDAR sweeps 502, 504, the inputs 552, low-level features, and/or other features as described in FIGS. 5A, 5B, and 5C. The data source may also store ground truth vectors (y*) corresponding to the sensor data (x). The ground truth vectors (y*) may store ground truth information for the flow determined by the flow network 520, the velocity determined by the velocity network 570, and the parked car classification determined by the parked vehicle classifier 550.

The parked vehicle recognition system 390 may be initialized with a set of parameters w. The parameters may be used by layers of the parked vehicle recognition system 390 to set weights and biases of the associated networks, such as the vehicle feature model 500, the flow network 520, the velocity network 570, and/or the parked vehicle classifier 550. During training, the parked vehicle recognition system 390 receives sensor data (x) to transform the sensor data (x) to a vector (y). In the example of FIG. 5D, the parked vehicle recognition system 390 is represented as a function F( ). The output (y) includes the flow estimation, the velocity estimation, and the parked car classification.

The output (y) of the parked vehicle recognition system 390 is received at a loss function 580. The loss function 580 compares the output (y) to the ground truth vector (y*). The error is the difference (e.g., loss) between the output (y) and the ground truth vector (y*). The error is output from the loss function 608 to the model 600. The error is backpropagated through the parked vehicle recognition system 390 to update the parameters. The training may be performed during an offline phase of the parked vehicle recognition system 390. As discussed, the parked vehicle recognition system 390 may be trained to reduce a total loss $\mathcal{L}_{total}$, which may be a sum of velocity loss $\mathcal{L}_v$, the flow loss $\mathcal{L}_f$ and the classification loss $\mathcal{L}_{BCE}$. That is, $\mathcal{L}_{total} = \alpha \mathcal{L}_f + \beta \mathcal{L}_v + \gamma \mathcal{L}_{BCE}$.

Figure 6:
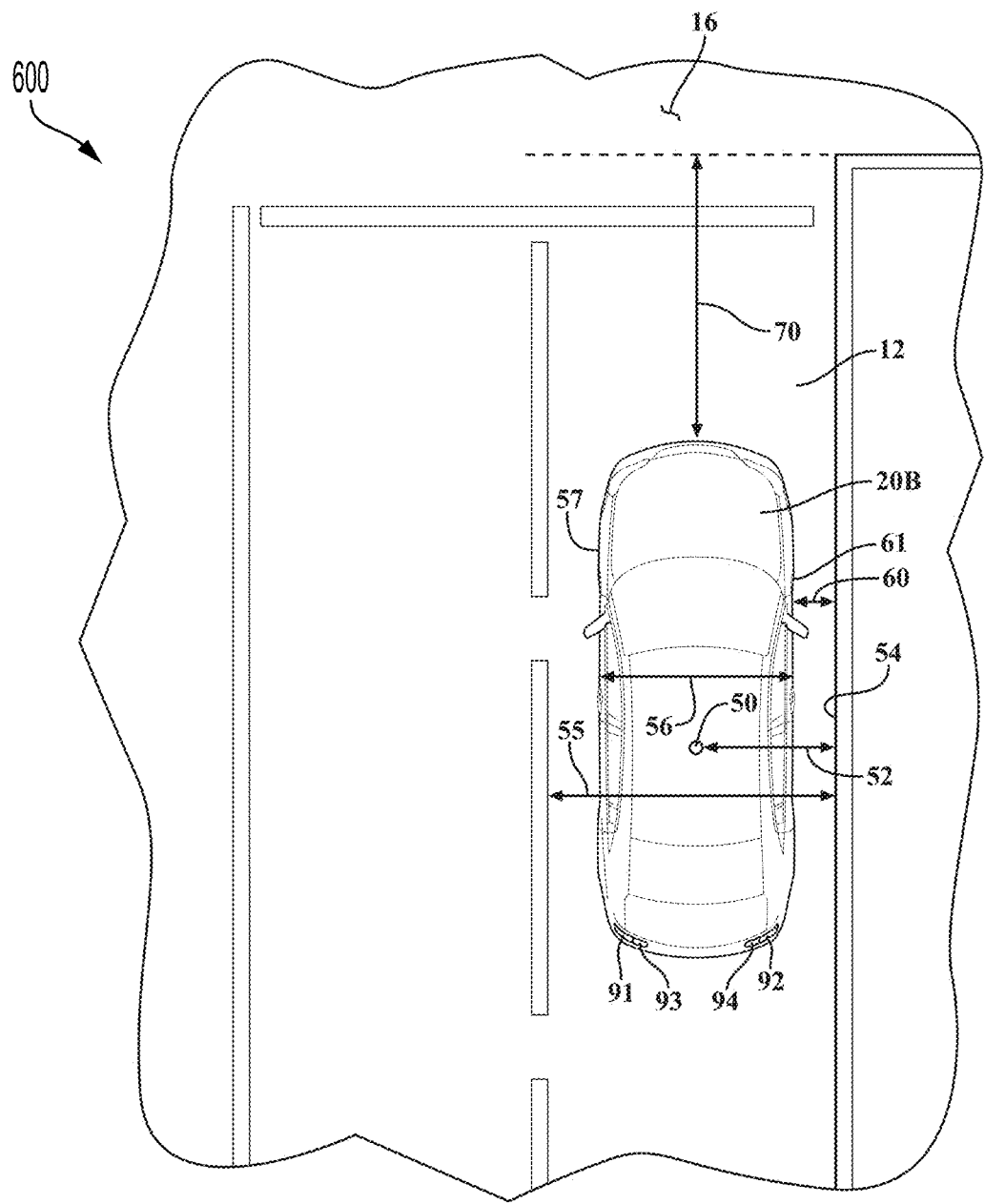
FIG. 6 is a block diagram illustrating an example of vehicle estimated features, in accordance with various aspects of the present disclosure.

As discussed, the parked vehicle classifier 550 may use vehicle estimated features. FIG. 6 is a block diagram illustrating an example 600 of vehicle estimated features, in accordance with various aspects of the present disclosure. In the example of FIG. 6, the vehicle estimated features can include the distance 52 from a center point 50 of the vehicle 20B to the road boundary 54. The vehicle estimated features can also include the distance 70 to the nearest intersection 16. The free lane ratio is the ratio of the width 55 of the northbound lane 12A with respect to the width 56 of the vehicle 20B. The edge distance 60 may be the distance between a side 61 of the vehicle 20B nearest the road boundary 54 and the road boundary 54.

As discussed, the parked vehicle classifier 550 may also use vehicle taillight features generated by a taillight features model. The vehicle taillight features may provide information relating to one or more taillights of an external vehicle. For example, referring to FIG. 6, the vehicle 20B includes taillights 91-94. In this example, the taillights 91 and 92 are brake lights, while the taillights 93 and 94 are turn signal lights, which may indicate a direction in which the vehicle 20B intends to turn. Again, this is just one example of a taillight configuration for the vehicle. In some cases, the taillights and brake lights may be integrated. Furthermore, the taillights 91-94 or subset thereof may act as hazard lights.

Figure 7:
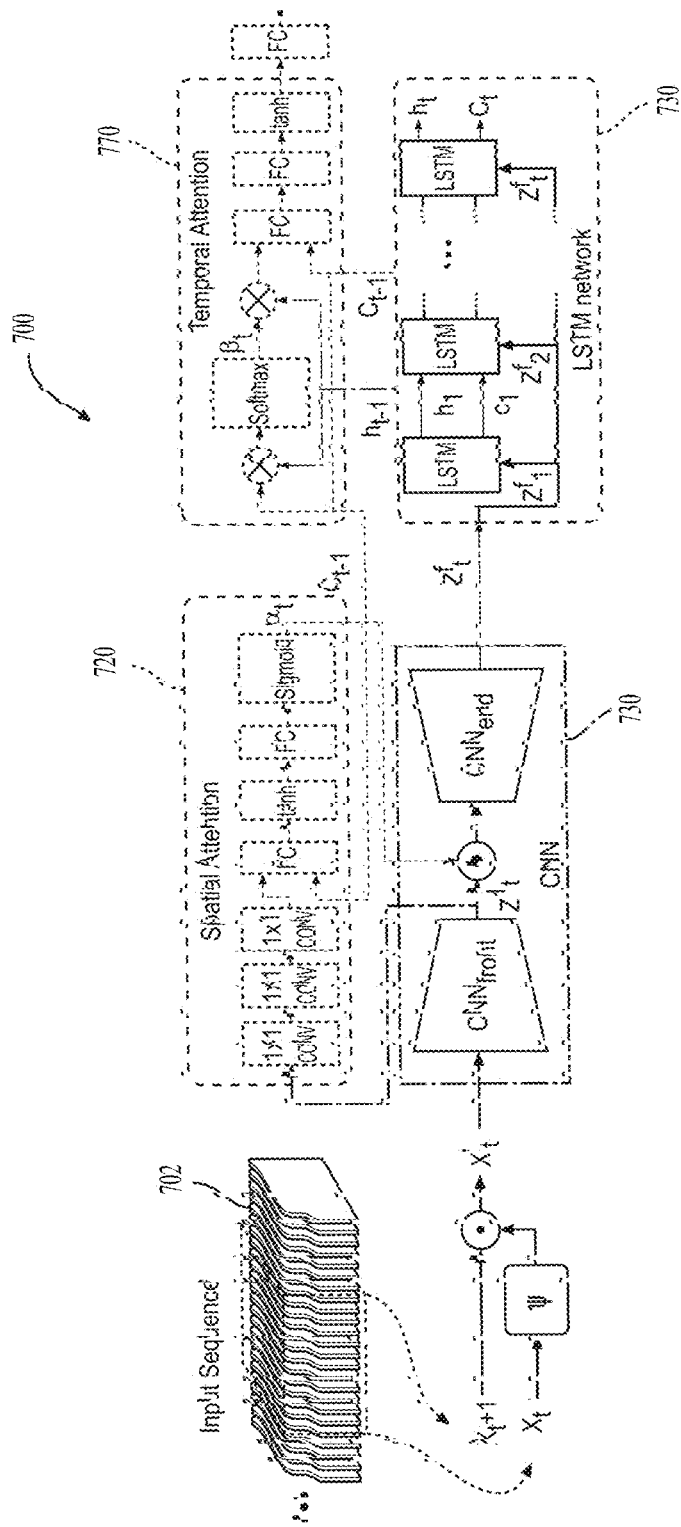
FIG. 7 is a block diagram illustrating an example of a taillight features model, in accordance with various aspects of the present disclosure.

The taillight features model may be in the form of one or more neural networks. FIG. 7 is a block diagram illustrating an example of a taillight features model 700, in accordance with various aspects of the present disclosure. As shown in FIG. 7, the taillight features model 700 may utilize a convolutional neural network (CNN) of a CNN-long short-term memory (CNN-LSTM) framework on a selected region of the sequence of images according to a spatial attention model for a vehicle taillight recognition task. The CNN-LSTM framework integrates a spatial attention model 720 and a temporal attention model 770 for vehicle taillight recognition.

Here, an input image sequence 702 of the taillight features model 700 is a chunk of a video sequence that may have been captured by a camera sensor(s) of the sensor system 102. The video sequence may be sampled by window-sliding along the temporal direction. In this configuration, an instance detection/segmentation technique is used to extract bounding boxes from video frames of the input image sequence 702.

Each image of the input image sequence 702 is forwarded to certain layers of a CNN 710 to obtain deep features. The spatial attention model 720 from the CNN 710 selectively focuses on a selected region (e.g., bounding boxes) in the input image sequence 702 using an attention weight given for each region and forwards the element-wise attention weights to the CNN 710, which is forwarded to the LSTM network 730. The LSTM network 730 selects frames within the selected region of the sequence of images according to a temporal attention model 770 for vehicle taillight state recognition. As such, the taillight features model 700 can determine vehicle taillight features, such as a taillight off probability, a left taillight on probability, a right taillight on probability, and a hazard light on probability.

Figure 8:
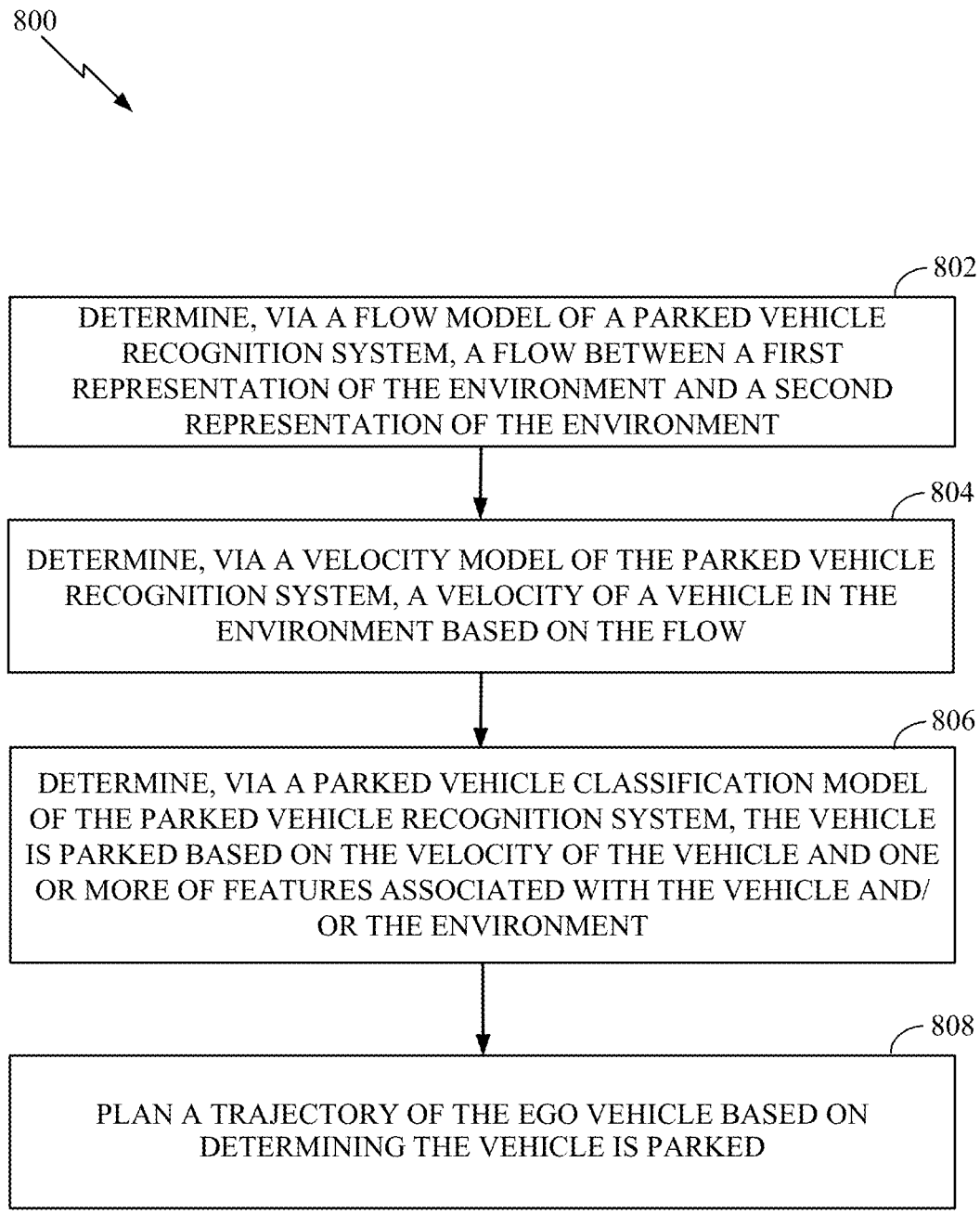
FIG. 8 is a flowchart illustrating a method for a parked vehicle recognition system, in accordance with various aspects of the present disclosure.

FIG. 8 is a flowchart illustrating a process 800 for parked vehicle recognition, according to aspects of the present disclosure. The process 800 may be performed by parked vehicle recognition system 390 as described with reference to FIG. 3. At block 802, the process 800 determines, via a flow model of a parked vehicle recognition system, a flow between a first representation of the environment and a second representation of the environment. In some examples, the process 800 may obtain the first representation via a first LiDAR sweep performed at a first time period, and also obtain the second representation via a second LiDAR sweep performed at a second time period.

At block 804, the process 800 determines, via a velocity model of the parked vehicle recognition system, a velocity of a vehicle in the environment based on the flow. At block 806, the process 800 determines, via a parked vehicle classification model of the parked vehicle recognition system, the vehicle is parked based on the velocity of the vehicle and one or more of features associated with the vehicle and/or the environment. The one or more features include vehicle estimated features and other features. In some examples, the vehicle estimated features include one or more of an object type of the vehicle, a first distance from a center point of the vehicle to a road boundary, an estimated absolute speed of the vehicle, a second distance to a nearest intersection from the vehicle, a map location type, a free lane ratio, or an edge distance between an edge of the vehicle and the road boundary. Additionally, or alternatively, the velocity may be concatenated with the vehicle estimated features.

At block 808, the process 800 plans a trajectory of the ego vehicle based on determining the vehicle is parked. In some examples, the flow model is associated with a flow loss, the velocity model is associated with a velocity loss, and the parked vehicle classification model is associated with a parked vehicle loss. In such examples, the process 800 may train the parked vehicle recognition system end-to-end to minimize a sum of the flow loss, the velocity loss, and the parked vehicle loss.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method controlling an ego vehicle in an environment, comprising:
   determining, via a flow model of a parked vehicle recognition system, a flow between a first representation of the environment and a second representation of the environment, the first representation and the second representation being captured by one or more sensors associated with the ego vehicle;
   determining, via a velocity model of the parked vehicle recognition system, a velocity of a vehicle in the environment based on the flow;
   determining, via a parked vehicle classification model of the parked vehicle recognition system, the vehicle is parked based on the velocity of the vehicle and one or more of features associated with the vehicle and/or the environment, the one or more features being extracted from one or both of the first representation or the second representation of the environment via a feature extractor associated with the parked vehicle classification model;
   planning a trajectory of the ego vehicle based on determining the vehicle is parked; and
   controlling the ego vehicle to follow the trajectory based on the environment.

2. The method of claim 1, wherein the one or more features include vehicle estimated features.

3. The method of claim 2, wherein the vehicle estimated features include one or more of an object type of the vehicle, a first distance from a center point of the vehicle to a road boundary, an estimated absolute speed of the vehicle, a second distance to a nearest intersection from the vehicle, a map location type, a free lane ratio, or an edge distance between an edge of the vehicle and the road boundary.

4. The method of claim 2, wherein the velocity is concatenated with the vehicle estimated features.

5. The method of claim 1, further comprising: obtaining the first representation via a first LiDAR sweep performed at a first time period via the one or more sensors; and obtaining the second representation via a second LiDAR sweep performed at a second time period via the one or more sensors.

6. The method of claim 1, wherein the flow model is associated with a flow loss, the velocity model is associated with a velocity loss, and the parked vehicle classification model is associated with a parked vehicle loss.

7. The method of claim 6, further comprising training the parked vehicle recognition system end-to-end to minimize a sum of the flow loss, the velocity loss, and the parked vehicle loss.

8. An apparatus for controlling an ego vehicle in an environment the apparatus comprising:
   at least one processor; and
   at least one memory coupled with the at least one processor and storing instructions operable, when executed by the at least one processor, to cause the apparatus:
      to determine, via a flow model of a parked vehicle recognition system, a flow between a first representation of the environment and a second representation of the environment, the first representation and the second representation being captured by one or more sensors associated with the ego vehicle;
      to determine, via a velocity model of the parked vehicle recognition system, a velocity of a vehicle in the environment based on the flow;
      to determine, via a parked vehicle classification model of the parked vehicle recognition system, the vehicle is parked based on the velocity of the vehicle and one or more of features associated with the vehicle and/or the environment, the one or more features being extracted from one or both of the first representation or the second representation of the environment via a feature extractor associated with the parked vehicle classification model;
      to plan a trajectory of the ego vehicle based on determining the vehicle is parked; and
      to control the ego vehicle to follow the trajectory based on the environment.

9. The apparatus of claim 8, wherein the one or more features include vehicle estimated features.

10. The apparatus of claim 9, wherein the vehicle estimated features include one or more of an object type of the vehicle, a first distance from a center point of the vehicle to a road boundary, an estimated absolute speed of the vehicle, a second distance to a nearest intersection from the vehicle, a map location type, a free lane ratio, or an edge distance between an edge of the vehicle and the road boundary.

11. The apparatus of claim 9, wherein the velocity is concatenated with the vehicle estimated features.

12. The apparatus of claim 8, wherein execution of the instructions further cause the apparatus to: obtain the first representation via a first LiDAR sweep performed at a first time period via the one or more sensors; and obtain the second representation via a second LiDAR sweep performed at a second time period via the one or more sensors.

13. The apparatus of claim 8, wherein the flow model is associated with a flow loss, the velocity model is associated with a velocity loss, and the parked vehicle classification model is associated with a parked vehicle loss.

14. The apparatus of claim 13, wherein execution of the instructions further cause the apparatus to train the parked vehicle recognition system end-to-end to minimize a sum of the flow loss, the velocity loss, and the parked vehicle loss.

15. A non-transitory computer-readable medium having program code recorded thereon for controlling an ego vehicle in an environment the program code executed by at least one processor and comprising:
   program code to determine, via a flow model of a parked vehicle recognition system, a flow between a first representation of the environment and a second representation of the environment, the first representation and the second representation being captured by one or more sensors associated with the ego vehicle;
   program code to determine, via a velocity model of the parked vehicle recognition system, a velocity of a vehicle in the environment based on the flow;
   program code to determine, via a parked vehicle classification model of the parked vehicle recognition system, the vehicle is parked based on the velocity of the vehicle and one or more of features associated with the vehicle and/or the environment, the one or more features being extracted from one or both of the first representation or the second representation of the environment via a feature extractor associated with the parked vehicle classification model;
   program code to plan a trajectory of the ego vehicle based on determining the vehicle is parked; and
   program code to control the ego vehicle to follow the trajectory based on the environment.

16. The non-transitory computer-readable medium of claim 15, wherein the one or more features include vehicle estimated features.

17. The non-transitory computer-readable medium of claim 16, wherein the vehicle estimated features include one or more of an object type of the vehicle, a first distance from a center point of the vehicle to a road boundary, an estimated absolute speed of the vehicle, a second distance to a nearest intersection from the vehicle, a map location type, a free lane ratio, or an edge distance between an edge of the vehicle and the road boundary.

18. The non-transitory computer-readable medium of claim 16, wherein the velocity is concatenated with the vehicle estimated features.

19. The non-transitory computer-readable medium of claim 15, wherein the program code further includes: program code to obtain the first representation via a first LiDAR sweep performed at a first time period via the one or more sensors; and program code to obtain the second representation via a second LiDAR sweep performed at a second time period via the one or more sensors.

20. The non-transitory computer-readable medium of claim 15, wherein: the flow model is associated with a flow loss, the velocity model is associated with a velocity loss, and the parked vehicle classification model is associated with a parked vehicle loss; and the program code further includes program code to train the parked vehicle recognition system end-to-end to minimize a sum of the flow loss, the velocity loss, and the parked vehicle loss.

* * * * *